United States Patent [19]
Radke et al.

[11] 3,819,203
[45] June 25, 1974

[54] INFLATION APPARATUS FOR SAFETY DEVICE

[75] Inventors: Donald G. Radke, Rochester; Robert L. Stephenson, Sterling Heights, both of Mich.

[73] Assignee: Allied Chemical Corporation, New York, N.Y.

[22] Filed: Mar. 29, 1972

[21] Appl. No.: 239,065

[52] U.S. Cl. .................................. 280/150 AB
[51] Int. Cl. ................................. B60k 21/08
[58] Field of Search ........................ 280/150 AB

[56] References Cited
UNITED STATES PATENTS

| | | | |
|---|---|---|---|
| 3,506,281 | 4/1970 | Berryman | 280/150 AB |
| 3,527,472 | 9/1970 | Chute et al. | 280/150 AB |
| 3,580,603 | 5/1971 | Chute et al. | 280/150 AB |
| 3,600,003 | 8/1971 | Carey | 280/150 AB |
| 3,602,526 | 8/1971 | Brawn | 280/150 AB |
| 3,618,979 | 11/1971 | Gulette | 280/150 AB |
| 3,625,543 | 12/1971 | Wolff | 280/150 AB |
| 3,674,059 | 7/1972 | Stephenson | 141/4 |
| 3,674,284 | 7/1972 | Lohr | 280/150 AB |
| 3,680,884 | 8/1972 | Stephenson | 280/150 AB |
| 3,727,942 | 4/1973 | Arntgon et al. | 280/150 AB |
| 3,752,501 | 8/1973 | Daniel et al. | 280/150 AB |

*Primary Examiner*—Leo Friaglia
*Assistant Examiner*—John P. Silverstrim
*Attorney, Agent, or Firm*—Jonathan Plaut; Ernest D. Buff

[57] ABSTRACT

A safety apparatus for vehicle passengers comprising a plurality of gas producing components in communication with a substantially annular inflatable bag. Gas is delivered from the gas producing components into the bag upon receipt of an electrical current from an impact detecting means responsive to impact of a vehicle in which the apparatus is disposed. The bag can be disposed around the hub of the vehicle's steering wheel so as to provide for continuous access to the hub, and inflates to produce a stronger bag than results when a spherical bag having the same volume is inflated.

12 Claims, 4 Drawing Figures

INFLATION APPARATUS FOR SAFETY DEVICE

BACKGROUND OF THE INVENTION

1. Field of the Invention

This invention relates to a safety device for passengers or other mobile objects in motor vehicles, such as automobiles, and more particularly to a compact apparatus, adapted to be mounted on the steering wheel of a motor vehicle, for inflating a bag with gas to a substantially annular (ring-shaped) configuration upon collision of the vehicle.

2. Description of the Prior Art

Passive vehicle occupant restraint systems have been recently developed which should significantly decrease the number of fatilities and serious injuries resulting from motor vehicle accidents. Among these passive restraint systems the inflatable bag restraint system is considered the most promising.

One of the problems heretofore encountered in adapting inflatable bag restraint systems for use on the steering wheel of a motor vehicle is the limited space available for the installation of apparatus used to house and deliver gas into the inflatable bag. The space which is available is located at the hub of the steering wheel and extends a relatively short distance from the junction of the steering column and the steering wheel hub toward the rear of the vehicle. Bag inflation apparatus installed within that space conventionally comprises a plurality of gas producing components, including a gas containing vessel and a gas generating vessel, connected to a gas diffuser by a manifold. The walls of the manifold must have sufficient strength to withstand the high gas pressures exerted therewithin during inflation of the bag. In addition, the diameter of a conventional manifold must be large enough to rapidly transfer gas from the gas producing components into the inflatable bag. Both the weight and the size of conventional inflation apparatus are, therefore, substantial. As a result, when conventional inflation apparatus is connected to the steering wheel of a motor vehicle, the limited space central to the hub becomes occupied by the apparatus, and the steering wheel cannot be attached to or removed from the steering column without first removing the inflation apparatus from the center of the steering wheel hub.

It would be particularly advantageous if the inflation apparatus could be installed on the steering wheel as part of an in-line assembly operation, and the wheel could be subsequently attached to the steering column without first removing the inflation apparatus. But up to the time of the present invention, such apparatus has not been proposed. A current trend toward functional, compact motor vehicles has increased the difficulty of providing sufficient space within the steering wheel to accomodate inflatable bag restraint systems. For the above reasons, bag inflation apparatus of the type described has generally resulted in higher installation and maintenance costs than are considered to be desirable for commercial applications.

Another problem associated with bag inflation apparatus adapted for installation central to the steering wheel hub, is related to the shape of the inflatable bag. The limited space available for storing the inflatable bag at the center of the steering wheel has generally resulted in the use of relatively small bags which inflate to a spherical shape. It has been found that upon contact with an inflatable bag which is spherical in shape, an occupant may be deflected along a side of the bag and into a hard portion of the vehicle. A bag configuration which affords increased protection against such deflection and which results in a stronger bag construction, would have significant advantage over the spherical bag configuration suggested by prior art workers.

SUMMARY OF THE INVENTION

The invention provides a bag inflation apparatus comprising a plurality of gas producing components in communication with an inflatable bag which has a substantially annular (ring-shaped) configuration. Gas is delivered from a gas source into the bag upon receipt of an electrical current from an impact detecting means responsive to impact of a vehicle in which the apparatus is disposed. The bag is rapidly inflated by the gas to a substantially annular configuration and provides a shock absorbing cushion between hard portions of the vehicle and passengers or other mobile objects contained therein. The substantially annular configuration of the bag increases the surface area of the bag. Accordingly, the bag inflates to produce a stronger air cushion than results when an air cushion having the same volume is inflated to a spherical configuration.

Moreover, the substantially annular configuration of the bag permits it to be disposed around the hub of the steering wheel of a motor vehicle so as to provide for continuous access to the hub. For this reason, the inflation apparatus is particularly adapted to be mounted on the steering wheel of a motor vehicle.

In a preferred embodiment of the invention, a plurality of gas producing components is connected to an inflatable bag by a manifold; and the resulting assembly is attached to the steering wheel of a motor vehicle. Each of the manifold and bag has a substantially annular configuration and is disposed, along with the gas producing components, around the hub of the steering wheel. The substantially annular configuration of the manifold and bag and their disposition with respect to the hub permits continuous access to the port of connection between the steering wheel and the steering column. As a result, the inflation apparatus of the present invention can be installed on the steering wheel and the wheel can be subsequently attached to or removed from the steering column without previously removing the inflation apparatus from the wheel.

The bag inflation apparatus of this invention has significant structural features. First of all, the outer peripheral surface of the substantially annular air bag is strengthened by the inner peripheral surface of the bag. Secondly, upon inflation, the inner peripheral surface of the bag slopes away from an occupant seated therebehind and toward the opening in the central portion of the bag. Thus, upon contact with the bag, the occupant is less likely to be deflected along a side of the bag and into a hard portion of the vehicle.

BRIEF DESCRIPTION OF THE DRAWINGS

The invention will be more fully understood and further advantages will become apparent when reference is made to the following detailed description and the accompanying drawings in which.

DESCRIPTION OF THE PREFERRED EMBODIMENTS

Most types of bag inflation apparatus conventionally employed in motor vehicle occupant restraint systems may be fabricated in a substantially annular configuration. As a consequence, the present invention will function with most varieties of apparatus for housing and delivering gas into an inflatable bag. For illustrative purposes, the invention is described in connection with a hybrid gas source having a gas containing portion provided with a pressurized gas and a gas generating portion provided with a gas generating material. However, the inflating gas can be supplied from a gas source employing either stored or generated gas solely. Accordingly, the invention is intended to encompass modifications of the preferred embodiment which use a plurality of gas producing components to inflate a bag to a substantially annular configuration.

Figure 1:
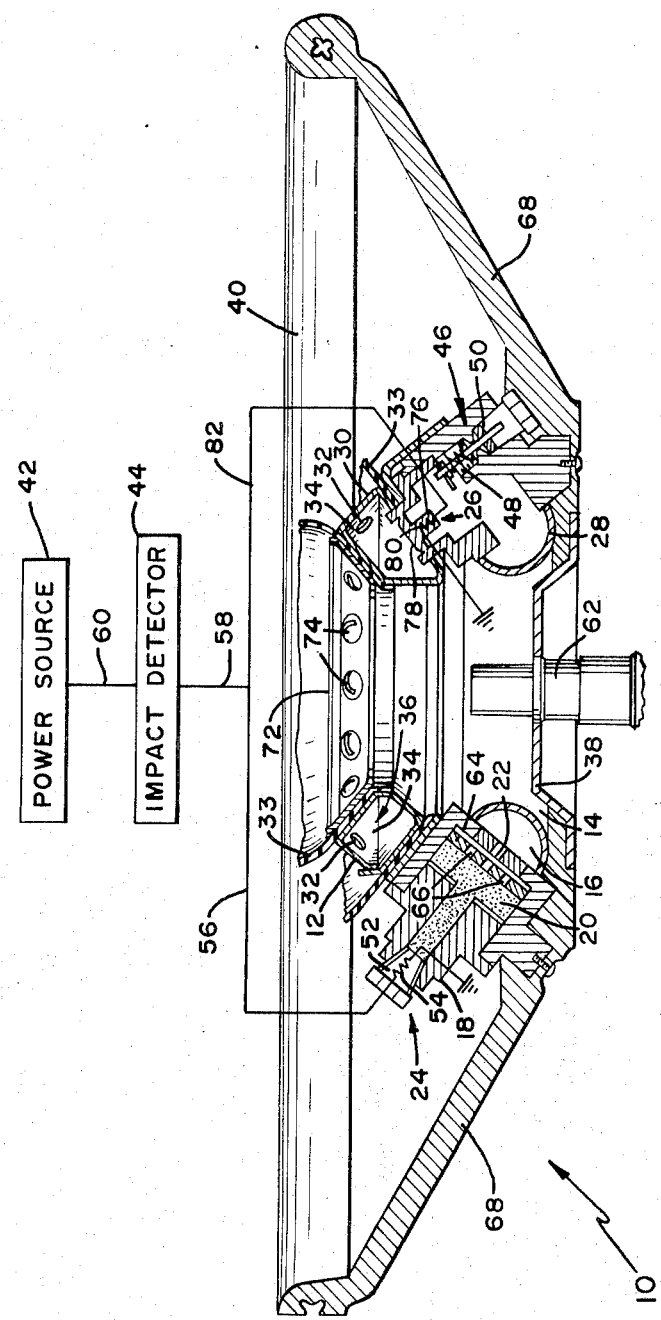
FIG. 1 is a front elevation of preferred apparatus for housing and delivering gas into an inflatable bag, the apparatus being mounted on a steering wheel attached to a steering column.

Referring to FIG. 1 of the drawings, the apparatus, shown generally at 10, includes a plurality of gas producing components connected to a manifold 12. The gas producing components include a gas source having a gas containing portion 14 filled with a pressurized gas 16 and a gas generating portion 18 provided with a gas generating material 20, a pressure sensitive barrier 22 disposed between the gas containing portion 14 and the gas generating portion 18, an actuating means, generally indicated at 24, for initiating the generation of gas within the gas generating portion 18 and gas releasing means, generally indicated at 26, for releasing gas from the gas containing portion 14. A housing 28 forms the exterior surface of the gas containing portion 14 and contains the pressurized gas 16. The manifold 12 includes a substantially rigid casing 30 having a plurality of apertures 32 therein which communicate with the mouth 99 of an inflatable bag 33 which is shaped like a doughnut. Mouth 99 of bag 33 surrounds substantially the entire exterior surface of the manifold 12 so that leaks and seepage of gas within the manifold 12 are passed into the bag, and elaborate gasketing is unnecessary. As used in the specification and the claims, the term "substantially the entire exterior surface" is intended to include, as well, the entire exterior surface. The interior surface of the manifold 12 forms conduit 34. The gas releasing means separates the pressurized gas 16 from the conduit 34. Each of the manifold 12, the gas containing portion 14 and the bag 33 has a substantially annular configuration and is disposed around the hub 38 of a steering wheel 40. An electrical current supplied by an electrical power source 42 is selectively directed to the actuating means 24, and to the gas releasing means 26 by an impact detector 44 responsive to impact of a vehicle within which the apparatus 10 is disposed. An orifice is selectively provided in the housing 28 by the gas releasing means 26, which places the gas containing portion in communication with the conduit 34. Gas discharged from the gas containing portion 14 and from the gas generating portion 18 upon receipt of the electrical current sequentially passes through the conduit 34 and the apertures 32 into the bag 33, which is rapidly inflated by the gas to a substantially annular configuration.

The gas containing portion 14 includes a gas inlet means, shown generally at 46. In a preferred embodiment, the gas inlet means comprises a tapped hole 48 which communicates with a source of pressurized gas (not shown) and a check valve 50. The use of the check valve 50 is preferred in order to prevent back flow of the pressurized gas 16. In FIG. 1, the gas inlet means 46 is shown disposed at the downstream end of the gas containing portion 14. It should be appreciated that this position of the inlet means 46 is optional and that in other embodiments the location of the inlet means 46 may be in other positions on the gas containing portion 14. The gas containing portion 14 is filled by injecting a pressurized gas 16 through the gas inlet means 46 until a preselected pressure is attained within the gas containing portion 14. Nitrogen, argon, air or other suitable gas which is not toxic to humans, does not have a deleterious effect on the inflatable bag 33, and can be stored for prolonged periods without leaking from the gas containing portion 14 is generally used as the pressurized gas 16. The gas containing portion 14 has a volume in the range of about 4 to 15 cubic inches, and preferably about 8 cubic inches. The pressurized gas 16 is normally contained within the gas containing portion 14 at a pressure in the range of about 1,000 to about 3,000 pounds per square inch, and preferably at about 2,000 pounds per square inch. Pressures exerted within the gas containing portion 14 by admixture of the stored and generated gases may increase the pressure in the gas containing portion to a pressure in the range of about 3,000 to about 5,000 psi or more.

The gas generating portion 18 contains the actuating means 24, including a squib 52. The squib 52 is structurally connected to a resistance element, such as a bridge wire 54, which will produce a suitable volume resistively to heat and ignite the squib 52, upon passage of an electrical current therethrough. The bridge wire 54 is electrically connected via lines 56 and 58 to an impact detector 44, which selectively connects the bridge wire 54 to line 60 and electrical power source 42 upon impact of a vehicle in which the apparatus 10 is disposed. The gas generating portion 18 is provided with the gas generating material 20 disposed adjacent to the squib 52. Black powder, nitrocellulose, composite propellant such as ammonium perchlorate and polyvinyl chloride, or other material which generates gas and heat upon combustion can be used as the gas generating material.

The volume and pressure of the pressurized gas 16 selected will depend upon the volume of the inflatable bag 33, and the pressure and volume of gas produced by the gas generating material. In the embodiments shown in FIGS. 1 and 4, the volume and pressure of the pressurized gas 16 is at least about 25 percent of the volume and pressure of gas generated by combustion of the gas generating material 20. The volume of gas stored within the gas containing portion 14 can be varied in order to maximize the high pressure gas potential and minimize the volume of the gas source. Thus, the inflating gas can consist solely of gas generating from a single gas generating charge. Alternatively, a second gas generation portion (not shown) can be substituted for the gas containing portion 14. Such plural gas generating portions are preferably disposed in a symmetrical arrangement about the center line of steering column 62 for balance. In a preferred embodiment of the invention, a hybrid combination of pressurized gas and gas 16 is stored within the gas containing portion 18 at sufficient pressure and volume to substantially fill the bag 33.

The gas containing portion 14, which contains gas 16 stored under pressure, and the gas generating portion 18, which includes the combustible gas generating material 20, respectively represent separate compartments of a pressurized tank. Means are provided for permitting gas developed by combustion of the gas generating material 20 to flow into the gas containing portion 14. Such means may comprise a pressure sensitive barrier associated with the respective compartments. The pressure sensitive barrier 22 provides a wall common to the compartments and separates the pressurized gas 16 from the gas generating material 20. Such barrier is responsive to the pressure within the gas generation 20 and is designed to rupture when the pressure of gas generated by combustion of the gas generating material. exceeds a preselected pressure, as in the range of approximately 3,000 to 5,000 pounds per square inch. Alternatively, the barrier 22 can be removed after generation of the preselected pressure within the compartment housing the gas generating material by exploding an explosive charge mounted adjacent to the barrier (not shown) upon receipt of an electrical current from the power source 42. The carrier 22 may be constructed of plastic or other suitable material.

A diffuser 64 is disposed at the downstream end of the gas generating portion 18 and immediately upstream of barrier 22. The diffuser 64 contains a plurality of passageways 66 which cause gas generated by combustion of the gas generating material 20 to move into the gas containing portion 14 at a uniform pressure and velocity.

Because of the pressures which are maintained within the gas containing portion 14, the latter is provided with a relatively thick housing 28. The thickness of the housing 28 is designed to insure the structural integrity thereof if the housing 28 is subjected to pressures in excess of those anticipated. Preferably the housing 28 is constructed of steel or other suitable metal.

The gas containing portion 14 has a substantially annular configuration and is secured by suitable mechanical fastening means such as rivets 70 to connecting struts 68 between the rim of steering wheel 40 and the steering column 62. The substantially annular configuration of the gas containing portion 14 permits it to be disposed around the hub 38 of the steering wheel 40 so as to provide for continuous access to the hub 38. Other configurations of the gas containing portion 14, including a ring-shaped structure having a multi-sided peripheral surface, such as a pentagonal or a octagonal peripheral surface, or a structure wherein the ring is unclosed, such as one having either a U-shaped or an arcuate form can also be used. The gas containing portion shown in FIG. 1 is intended to be illustrative and should not be interpreted to limit the scope of the invention to the particular structure disclosed. Accordingly, the term "substantially annular configuration" as used in the specification and claims with reference to the gas containing portion is intended to include, as well, configurations of the type discussed in this paragraph.

The manifold 12 can be constructed in a variety of configurations, including configurations of the type previously mentioned in connection with the gas containing portion, which afford sufficient strength and structural capacity to withstand the pressures exerted therewithin during generation and release of the gas. For this reason, the term "substantially annular configuration", as used in the specification and claims with reference to the manifold, is intended to include, as well, configurations of the type discussed in the preceeding paragraph with reference to the gas containing portion. In a preferred embodiment of the invention, the manifold includes a substantially annular, rigid casing 30, a portion of which is provided with an outlet means comprising one or more apertures 32. The casing 30 is constructed of steel or other suitable material and has an interior surface which forms a conduit 34. The thickness of the casing 30 is sufficient to withstand pressures within the conduit 34 in the range of about 500–3,000 psi or more. An inflatable bag 33 is secured to casing 30 by suitable means such as clamps 72 and screws 74. The apertures 32 of outlet means 36 communicate with the mouth of the bag 33, and preferably act as a diffuser to cause gas which enters the conduit 34 to pass into the bag 33 at a uniform pressure and velocity.

In order to provide for the release of gas from the gas containing portion 14 an explosive charge, such as a detonator 76 is located adjacent to an outlet plug 78. The plug 78 separates conduit 34 from the pressurized gas 16. Detonator 76 is structurally connected to a resistance element, such as a bridge wire 80. The bridge wire 80 is electrically connected through lines 82 and 58 to line 60 and power source 42 by impact detector 44 upon impact of a vehicle in which the apparatus 10 is disposed.

Figure 2:
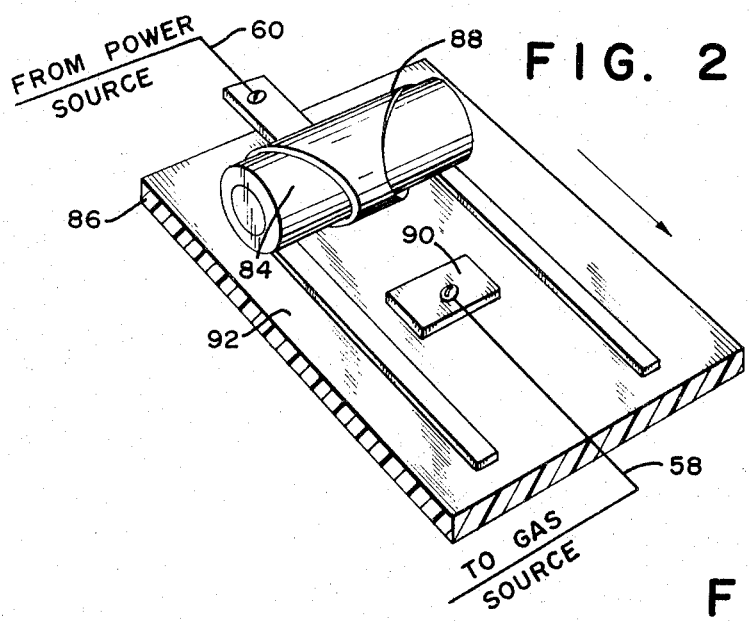
FIG. 2 is an isometric view of one form of the impact detecting means shown in FIG. 1.

In FIG. 2 there is illustrated one form of an impact detecting means. Other forms of impact detecting means can also be used. The impact detecting means shown in FIG. 2 should therefore be interpreted as illustrative and not in a limiting sense. Such means may comprise at least one roller 84 of metal such as stainless steel, gold plated copper, or other suitable conductive material. The roller 84 is electrically connected via line 60 to the power source 42 and movably mounted on a nonconductive support 86 made, for example, of polycarbonate. A thin band of electrically conductive material 88, such as stainless steel, gold plated copper or the like, wrapped around roller 84 and spot welded or otherwise secured to support 86, provides a resisting force against which the roller 86 acts. Conductive element 90, comprised of electroconductive material of the type used to make band 88 is fixedly mounted on support 86. If roller 84 is disposed along the surface 92 of support 86 in the direction of the arrow, band 88 is brought into contact with the conductive element 90. An electrical current is transmitted from the power source 42 through line 60, the impact detector 44, line 58, line 56 and line 82 to the gas producing components.

Figure 3:
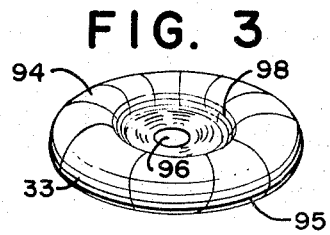
FIG. 3 is a perspective view of the bag shown in FIG. 1.

In FIG. 3 there is illustrated a perspective view of bag 33. The bag 33 preferably comprises a soft, flexible, tough, resilient material made, for example, from nylon having a thickness ranging from about 10 to about 50 mils. The material should be substantially tear resistant and capable of retaining its strength for extended periods in a folded condition. It is additionally preferred that the material comprising the exterior surface of bag 33 be substantially resistant to permeability by the gas producing components when it is in contact therewith over extended periods of time. When bag 33 is inflated to a substantially annular configuration, the outer peripheral surface 95 of the bag 33 is preferably provided with a substantially circular ridge portion 94. From this ridge 94, the exterior surface of the bag 33 slopes away from an occupant seated therebehind and toward an opening 96 at the central portion of the bag 33. It is to be understood, of course, that the opening 96 is sufficiently limited in size so that the inner peripheral surface 98 of the inflated bag 33 prevents the occupant from contacting the hub 38 or other hard portion of the vehicle around which the bag 33 is disposed. If an air bag is inflated to a spherical shape (not shown) the portion of the bag closest to an occupant seated therebehind forms an apex centrally disposed on the exterior surface of the bag. From this apex the exterior surface slopes away from the occupant and toward hard portions of the vehicle adjacent to the bag. Instead of moving from the apex downwardly along the periphery and away from the center of a spherically shaped bag, an occupant thrust into an inflated bag having a substantially annular configuration is caused to move from the substantially circular ridge 94 located relatively near the outer periphery 95 of the bag 33 downwardly toward opening 96. Thus the occupant is less likely to be deflected along a side of the bag and into a hard portion of the vehicle.

The outer peripheral surface 95 of the substantially annular air bag 33 is strengthened by the inner peripheral surface 98 of the bag 33. Such inner peripheral surface 98 is not present in bags having a substantially spherical configuration. Moreover, the substantially annular configuration increases the surface area of the bag 33. Accordingly, bag 33 inflates to produce a stronger air bag than results when a substantially spherical bag having the same volume is inflated.

Figure 4:
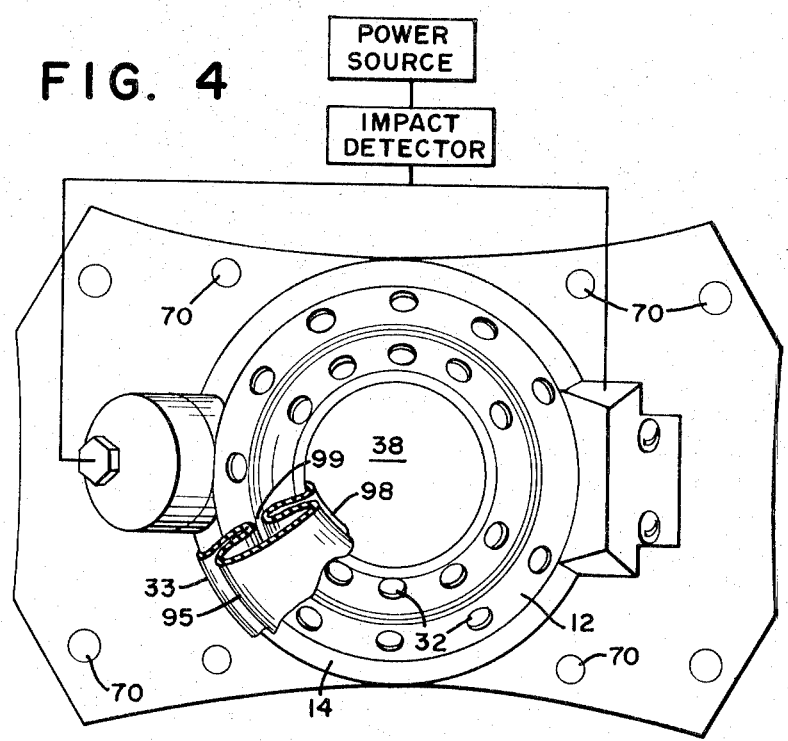
FIG. 4 is a plan view, partially cut away, of an alternate embodiment of the apparatus shown in FIG. 1.

In FIG. 4, there is illustrated a plan view, partially cut away, of an alternate embodiment of the apparatus shown in FIG. 1. In this embodiment of the invention, both the manifold and the gas producing components are located within the envelope of the bag 33, so that the manifold 12 and the gas producing components are entirely disposed within the bag 33. Any gas which leaks from the gas producing components into the conduit 34 will enter the bag 33. The bag 33 surrounds both the manifold 12 and the gas producing components so as to protect them against tampering or accidental damage. Gas entering the conduit 34 in a manner hereinafter described passes through apertures 32 of the outlet means and into bag 33, which is rapidly inflated thereby to a substantially annular configuration.

The apparatus 10 described herein is surprisingly compact. Accordingly, the apparatus 10 can be mounted to the steering wheel of an automobile or other vehicle. The substantially annular configuration of the bag 33 permits it to be disposed around the hub 38 of the steering wheel 40 so as to provide for continuous access to the port of connection between the steering wheel 40 and the steering column 62. As a result, the apparatus 10 can be installed on the steering wheel as part of an in-line assembly operation; and the wheel can be subsequently attached to or removed from the steering column without previously removing the inflation apparatus 10 from the wheel 40. The location of the apparatus 10 with respect to the hub 38 of the steering wheel 40 can be varied depending on the radius of the wheel 40 and the hub 38, the length of struts 68 and the angle of recess between the hub 38 and the rim of the wheel 40. For example, the apparatus 10 can be mounted on the struts 68 so that the apparatus 10 is substantially coaxially aligned with the hub 38 but is entirely disposed between the plane of the hub 38 and the plane of the rim of the wheel 40. Accordingly, whenever used in the specification and claims, the term "disposed around the hub of the wheel" is intended to include embodiments of the apparatus 10 aligned with the hub 38 and the steering column 62.

The operation of the apparatus 10 can be readily comprehended by reference to FIG. 1. Impact detector 44 electrically connects the bridge wire 80 connected to detonator 76 and the bridge wire 54 connected to the gas generating material 20, to the power source 42 upon impact of a vehicle in which the apparatus 10 is disposed. An electrical current is transmitted through lines 60, 58 and 82 to the bridge wire 80. The bridge wire 80 heats and detonates the detonator 76 upon receipt of the electrical current. Such detonation dislodges the plug 78 whereupon an orifice (not shown) is created in communication with the gas containing portion 14 and the conduit 34. The electrical current reaches the bridge wire 54 connected to squib 52 via lines 60, 58 and 56. Squib 52 is heated and ignited by the bridge wire 54 upon receipt of the electrical current. The squib 52 ignites the gas generating material and production of the generated gas commences. The gas pressure within the gas generating compartment increases to a preselected level, barrier 22 ruptures, and generated gas flows through the diffuser 64, the gas containing portion 14, the conduit 34 and the outlet means into bag 33, which inflates to provide a substantially annular shock absorbing medium between hard portions of the vehicle and passengers or other mobile objects contained therein.

Having thus described our invention in rather full detail, it will be understood that these details need not be strictly adhered to but that various changes and modifications may suggest themselves to one skilled in the art, all falling within the scope of our invention as defined by the subjoined claims.

We claim:

1. In a safety apparatus for vehicle passengers adapted to be mounted on the steering wheel of a motor vehicle, having a plurality of gas producing components connected to a manifold for delivering gas through the manifold and into an inflatable bag upon receipt of an electrical current from an impact detecting means responsive to impact of the vehicle, the improvement wherein the bag has a substantially annular configuration and is disposed around the hub of the steering wheel within the periphery of the wheel between the hub and the rim thereof.

2. Apparatus as recited in claim 1, wherein the manifold has a substantially annular configuration.

3. Apparatus as recited in claim 2, wherein the manifold has at least one aperture therein, said aperture being in communication with the inflatable bag, whereby an outlet means is provided in the manifold.

4. Apparatus as recited in claim 3, wherein the gas producing components include a gas containing portion provided with a pressurized gas, a gas generating portion provided with gas generating material, an actuating means for igniting the gas generating material upon receipt of the electrical current, barrier means removably disposed between the gas generating means and the gas containing means, and gas releasing means for releasing gas from the gas containing means.

5. Apparatus as recited in claim 4, wherein the gas containing portion has a substantially annular configuration.

6. Apparatus as recited in claim 5, wherein each of the manifold and the gas containing portion are disposed around the hub of the steering wheel.

7. Apparatus as recited in claim 6 wherein the barrier means provides a wall common to the gas containing portion and the gas generating portion, and is responsive to pressure within the gas generating portion, whereby means are provided for permitting generated gas to flow into the gas containing portion.

8. Apparatus as recited in claim 7, wherein the actuating means comprises (1) a squib disposed adjacent to the gas generating material, and (2) a bridge wire structurally connected to the squib and electrically connected to the impact detecting means, for igniting the squib upon receipt of the electrical current, whereby the squib ignites the gas generating material.

9. Apparatus as recited in claim 8, wherein the gas releasing means comprises (1) a plug separating the pressurized gas from a conduit formed by the interior surface of the manifold, (2) a detonator located adjacent to the plug, and (3) a bridge wire structurally connected to the detonator and electrically connected to the impact detecting means for detonating the detonator upon passage of the current through the bridge wire.

10. Apparatus as recited in claim 9, wherein the bag surrounds substantially the entire exterior surface of the manifold.

11. Apparatus as recited in claim 9, wherein the gas containing portion and the manifold are entirely disposed within the inflatable bag.

12. Safety apparatus for vehicle passengers comprising:
   a. an inflatable bag having a substantially annular configuration and being disposed around the hub of the vehicle's steering wheel within the periphery of the wheel between the hub and the rim thereof; and
   b. a plurality of gas producing components in communication with the inflatable bag for supplying gas to the bag upon impact of the vehicle.

* * * * *